US 8,566,340 B2

(12) United States Patent
Udupa et al.

(10) Patent No.: US 8,566,340 B2
(45) Date of Patent: Oct. 22, 2013

(54) PROVISION OF QUERY SUGGESTIONS INDEPENDENT OF QUERY LOGS

(75) Inventors: Uppinakuduru Raghavendra Udupa, Karnataka (IN); Bhole Abhijit Narendra, Gujarat (IN); Anuj Kumar Goyal, Pittsburgh, PA (US); Bjørn Olstad, Stathelle (NO)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/314,166

(22) Filed: Dec. 7, 2011

(65) Prior Publication Data

US 2013/0151533 A1 Jun. 13, 2013

(51) Int. Cl.
*G06F 17/30* (2006.01)

(52) U.S. Cl.
USPC .......................................... 707/767

(58) Field of Classification Search
CPC ...................................... G06F 17/30
USPC .................. 707/759, 765, 766, 767, 999.005
See application file for complete search history.

(56) References Cited

U.S. PATENT DOCUMENTS

| | | | | |
|---|---|---|---|---|
| 2002/0194178 A1* | 12/2002 | Gilmour et al. | ............... | 707/9 |
| 2004/0143569 A1 | 7/2004 | Gross et al. | | |
| 2006/0010126 A1* | 1/2006 | Anick et al. | .................. | 707/4 |
| 2006/0259494 A1 | 11/2006 | Watson et al. | | |
| 2008/0104052 A1* | 5/2008 | Ryan et al. | .................... | 707/5 |
| 2009/0204609 A1* | 8/2009 | Labrou et al. | .................. | 707/5 |
| 2010/0161617 A1* | 6/2010 | Cao et al. | .................... | 707/741 |
| 2010/0169320 A1 | 7/2010 | Patnam et al. | | |
| 2010/0228711 A1* | 9/2010 | Li et al. | ..................... | 707/706 |
| 2011/0307485 A1* | 12/2011 | Udupa et al. | ................. | 707/737 |
| 2012/0278350 A1* | 11/2012 | Bhatia et al. | .................. | 707/767 |
| 2012/0310966 A1* | 12/2012 | Kumar | ....................... | 707/767 |
| 2013/0066887 A1* | 3/2013 | Downs et al. | ................. | 707/749 |

OTHER PUBLICATIONS

"Hotmail: Search with Auto Suggestions", Retrieved at <<http://explore.live.com/windows-live-hotmail-search-auto-suggestions-using>>, Retrieved Date: Sep. 20, 2011, p. 1.
Dredze, et al., "Suggesting Email View Filters for Triage and Search", Retrieved at <<http://www.cs.jhu.edu/~mdredze/publications/dredze_ijcai_09.pdf>>, Proceedings of the 21st International Joint Conference on Artificial Intelligence (IJCAI), 2009, pp. 1-6.
Bhatia, et al., "Query Suggestions in the Absence of Query Logs", Retrieved at <<http://www.cse.psu.edu/~sub194/papers/sigir11.pdf>>, Proceedings of the 34th international ACM SIGIR Conference on Research and Development in Information (SIGIR), Jul. 24-28, 2011, pp. 1-10.

(Continued)

*Primary Examiner* — Dennis Truong
(74) *Attorney, Agent, or Firm* — Medley, Behrens & Lewis, LLC

(57) ABSTRACT

Described herein are various technologies pertaining to provision of query suggestions to a user independent of a query log. Key phrases are automatically identified in documents of a document corpus, and a forward index and inverted index are generated. The forward index indexes key phrases by documents, and the inverted index indexes documents by key phrases. A query is received from a user, and documents relevant to the query are retrieved. Key phrases in the retrieved documents are identified via the forward index, and a subset of the key phrases are selected as query suggestions by determining coverage of the key phrases as identified in the inverted index.

19 Claims, 9 Drawing Sheets

(56) References Cited

OTHER PUBLICATIONS

Bao, et al., "A Graph Approach to Spelling Correction in Domain-Centric Search", Retrieved at <<http://www.aclweb.org/anthology-new/P/P11/P11-1091.pdf>>, Proceedings of the 49th Annual Meeting of the Association for Computational Linguistics, Jun. 19-24, 2011, pp. 905-914.

"Hotmail Email Search (Find emails in Hotmail)", Retrieved at <<http://www.freeemailtutorials.com/windowsLiveHotmail/hotmailTipsAndTricks/hotmailEmailSearchFindMessages.php>>, Retrieved Date: Sep. 20, 2011, pp. 1-3.

* cited by examiner

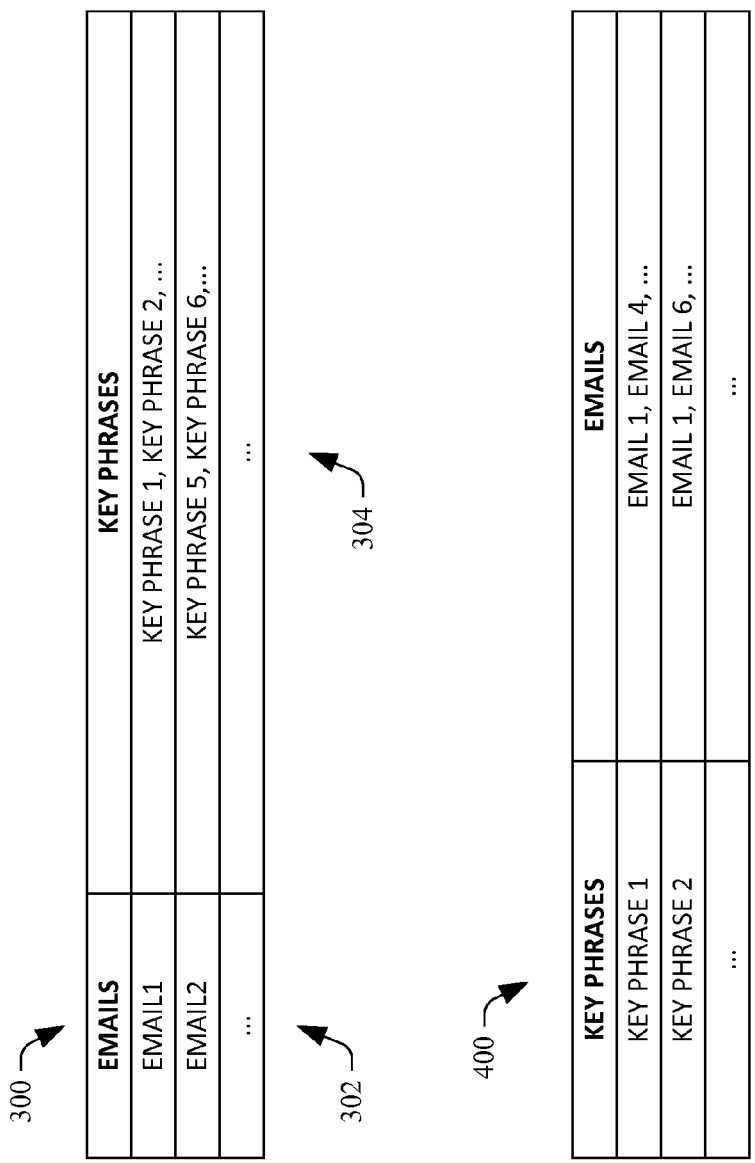

PROVISION OF QUERY SUGGESTIONS INDEPENDENT OF QUERY LOGS

BACKGROUND

Information Retrieval engines are configured to retrieve documents that are relevant to informational goals of a user responsive to receipt of a query from the user. Oftentimes it is difficult for a particular user to formulate a query that will result in the retrieval of information that is desired by the user. As the amount of information that is available to the users on Desktops, Enterprise Networks, Social Networks and the World Wide Web continues to rapidly grow, the tasks of providing relevant information responsive to receipt of a user query becomes increasingly difficult, even as Information Retrieval technology becomes more sophisticated.

An approach that has been successfully utilized to help users locate relevant information is the provision of suggested queries to the user, wherein the suggested queries are based upon other queries previously issued by other users of the search engine. Generally, the suggested queries provided to the user by the Information Retrieval engine have previously been successful in retrieving information that is relevant to users. For instance, query logs can indicate that when a certain query is issued, issuers of the query select a search result that is presented on a first search results page—which indicates that the query is properly formulated to return a search result that is relevant to informational goals of the users.

An exemplary form of Information Retrieval pertains to retrieving a particular document that is known to a user from a document corpus, which is in contrast to retrieving certain information without having knowledge of a certain document that includes such information. When a certain document is desirably located, query suggestions are generally not provided to users. Example situations where users desire to search for a particular document include the search for a particular email in an email inbox of the user, a search for a particular document stored on a hard drive of a computer of the user, etc. In such situations, query logs are either unavailable or not helpful, as there are an insufficient number of previously issued queries to learn which queries were beneficial to the user when the user performed a search over a document store using such queries.

Accordingly, if a user wishes to perform a search over an email inbox, the user must formulate a query and provide such query to a search algorithm in the email application. Many individuals have thousands, tens of thousands, or even hundreds of thousands of emails that are retained in their inboxes. Therefore, a query that is insufficiently specific may result in the provision of a relatively large number of search results, which may be cumbersome for the user to sift through to locate the desired document. The user can attempt to filter the search results by sender, date, or the like, or may attempt to reformulate the query until the desired document is located. The process of formulating queries, reviewing search results, and re-formulating queries to locate a desired document is a time-consuming and frustrating exercise to most users.

SUMMARY

The following is a brief summary of subject matter that is described in greater detail herein. This summary is not intended to be limiting as to the scope of the claims.

Described herein are various technologies pertaining to automatically providing a user with query suggestions responsive to the user issuing a query (or a portion of a query) to a search algorithm that is configured to execute a search over a document corpus using the query. As will be described in greater detail herein, the query suggestions are provided to the user independent of any query log that may exist with respect to the document corpus. In accordance with an embodiment that will be described in greater detail herein, to facilitate provision of query suggestions to the user independent of any query logs that may exist, off-line indexing over a document corpus can be undertaken.

For example, a document corpus can be accessed and n-grams can be extracted from each document in the document corpus. As used herein, an n-gram is a subsequence of words in a document from a sequence of words therein. In an exemplary embodiment, size of n-grams extracted from each document can range between one and five. For each n-gram that is extracted from documents in the document corpus, a well-formedness score can be computed, wherein the well-formedness score is indicative of parts of speech in the analyzed n-gram as well as arrangement of parts of speech in the n-gram. For instance, one or more natural language processing algorithms can be employed in connection with computing the well-formedness score. In another example, a series of rules can be analyzed with respect to an n-gram to compute the well-formedness score for each n-gram in the documents of the document corpus. In an exemplary embodiment, an n-gram that begins with a noun, a verb, or a participle and ends with a noun or a participle will be provided with a relatively high well-formedness score, while an n-gram that begins or ends with an adjective or adverb will be provided with a relatively low well-formedness score.

Each n-gram that has a well-formedness score above a predefined threshold can be retained as a candidate key phrase in a list of candidate key phrases. Subsequent to the list of candidate key phrases being generated, an informativeness score can be computed for each candidate key phrase. The informativeness score is indicative of a number of documents in the document corpus that are retrievable when searching the document corpus using the candidate key phrase as a query. A candidate key phrase that retrieves a small number of documents when used to search the document corpus will have a relatively high informativeness score while a candidate phrase that retrieves a large number of documents when used to search the document corpus will have a relatively low informativeness score. For each candidate key phrase, a respective informativeness score is compared with a predefined threshold, and candidate key phrases that have informativeness scores that are above the threshold are retained as key phrases. It can therefore be ascertained that key phrases in documents in the document corpus are identified based upon the well-formedness score and the informativeness score for each key phrase.

Two indexes can then be generated: a first index is a forward index, wherein identified key phrases are indexed by document identities, such that the forward index can be queried to identify which key phrases are included in a specified document. Additionally, an inverted index can be generated that indexes document identities by key phrases, such that the inverted index can be queried to identify which documents include a specified key phrase. As will be described below, the forward index and inverted index can be queried to provide query suggestions to a user responsive to receipt of a query. Subsequent to the forward index and the inverted index being generated, such indexes can be updated upon addition of a document to the document corpus or removal of a document from the document corpus. For instance, responsive to receiving an indication that a first document is deleted from the document corpus, the forward index and the reverse index can be updated based upon key phrases included in the first document.

A user may wish to search the document corpus to retrieve a certain document therefrom. Accordingly, the user can formulate a query and provide the query to a search application. Responsive to receiving the query, the forward index and inverted index can be accessed to provide the user with query suggestions, wherein the query suggestions are key phrases that are selectively provided to the user independent of any query logs. In an exemplary embodiment, such key phrases can be located while the user is typing in the query such that query completions are provided to the user. In another exemplary embodiment, query suggestions can be provided to the user responsive to the user providing the search application with an entirety of the query.

Pursuant to an example, the search application searches the document corpus for documents that can be retrieved utilizing the query provided by the user. Documents that are retrieved can be identified, and the forward index can be accessed to identify key phrases that are included in such documents. As a search may result in the return of a large number of documents, the number of key phrases may be relatively large (in the hundreds or even thousands). Accordingly, a subset of the key phrases that have been identified from the forward index is to be selected. For instance, the key phrases can be provided to an objective function, such as a linear integer program, which can access the inverted index to identify coverage of respective key phrases (e.g. for each key phrase, identify which documents will be retrieved by the key phrase if used as a query). The subset of key phrases can be selected to maximize a benefit to the user of providing the user with the subset of key phrases as suggested queries while minimizing a defined penalty. For instance, a benefit of a certain subset of key phrases may be little overlap amongst the subset of key phrases (the key phrases will return a relatively non-overlapping set of documents when used as queries over the document corpus), while a penalty may be assessed if a document in the search results is excluded (e.g., none of the key phrases in the selected subset will return the document when used as queries over the document corpus).

Responsive the subset of key phrases being identified for provision to the user as query suggestions, key phrases in such subset can be ranked through utilization of any suitable ranking technique. A ranked list of key phrases can then be presented to the user as a ranked list of suggested queries, wherein selection of a suggested query causes the search application to retrieve documents from the document store using the selected query suggestion. In another exemplary embodiment, the user can hover a cursor over a suggested query, and a tooltip can be presented that displays most recently or most recently received documents that are retrievable when searching the document corpus using the suggested query.

Other aspects will be appreciated upon reading and understanding the attached figures and description.

BRIEF DESCRIPTION OF THE DRAWINGS

FIG. 3 illustrates an exemplary forward index.

FIG. 4 illustrates an exemplary inverted index.

DETAILED DESCRIPTION

Figure 1:
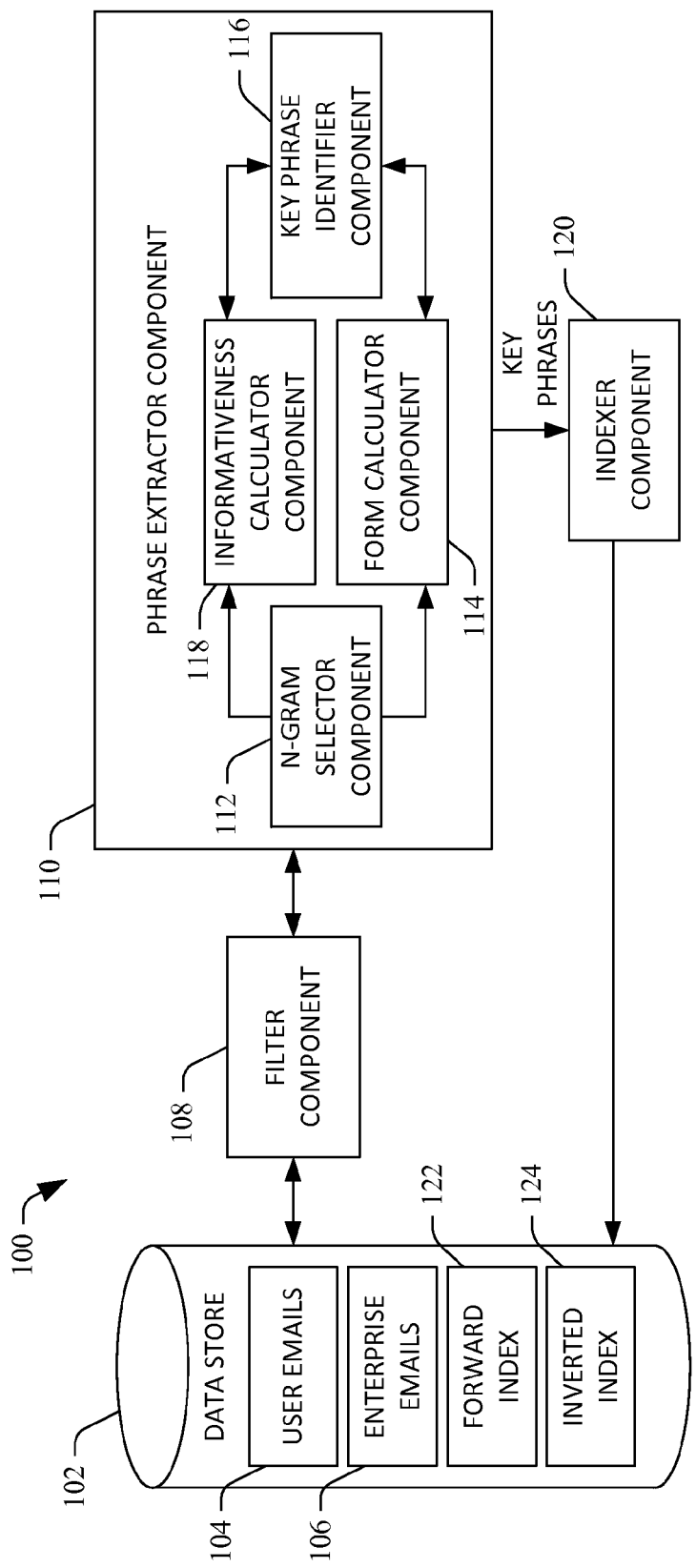
FIG. 1 is a functional block diagram of an exemplary system that facilitates identifying key phrases in documents of a document corpus.

Various technologies pertaining to automatic provision of query suggestions independent of query logs will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Described herein are various technologies pertaining to the automatic provision of query suggestions responsive to receipt of a user query, wherein the query is configured to locate a document in a document corpus, and wherein the suggested queries are provided independent of any query logs. The description herein pertains to an email application, wherein the user wishes to locate a particular email from an email corpus and wherein query suggestions are provided to the user for use in connection with searching over the email corpus. It is to be understood, however, that an email application is an exemplary application, and that query suggestions can be provided in applications that are configured to retrieve other types of documents, including instant messages between individuals, groups, or entities that are retained, word processing documents retained in a data repository or across data repositories, or other documents that include text. Thus, the examples set forth pertaining to emails are not intended to be limiting, but represent but one exemplary application of embodiments that will be described in greater detail herein.

With reference now to the drawings, FIG. 1 illustrates an exemplary system 100 that facilitates provision of query suggestions to a user independent of a query log. The system 100 comprises a data store 102 that retains user emails 104 and, optionally, enterprise emails 106. The user emails 104 include email messages received by a particular user and or sent by the particular user that have not been deleted by such user. The enterprise emails 106 include emails that are retained, for instance, by a company, university, or other entity with which the user is associated. Therefore, the enterprise emails 106 can include emails sent or received by users employed by a certain company, users who are students at a particular university, etc. The user emails 104 and/or enterprise emails 106 are referred to herein collectively as an email corpus. Thus, the email corpus may refer to only the user emails 104, only the enterprise emails 106, or the combination of the user emails 104 and the enterprise emails 106.

The system 100 comprises a filter component 108 that receives the email corpus and removes noise and/or repetitive content therefrom. For example, the user can receive an email, and such email can be retained in the email corpus. The user may reply to such email, wherein the newly generated reply includes text included in the reply along with previously received text. Therefore, the email corpus may include several emails in an email thread that comprise repetitive content. The filter component 108 can be configured to remove repetitive content from emails in the email corpus; the filter component 108 may then output text from emails in the email corpus that is free of noise and/or repetitive content.

The text output by the filter component 108 is received by a phrase extractor component 110 that selectively extracts well-formed and informative key phrases from the text provided by the filter component 108. As will be described in greater detail below, the phrase extractor component 110 identifies n-grams in the text received from the filter component 108 and assigns two values to each of such n-grams. A first value that is assigned to an n-gram by the phrase extractor component 110 is indicative of syntactic structure of the n-gram; in other words, the first value is indicative of parts of speech in the n-gram and arrangement of parts of speech in the n-gram. A second value that is assigned to the n-gram by the phrase extractor component 110 is indicative of a number of emails retrievable from the email corpus when querying the email corpus using the n-gram as the query. As will be described in greater detail below, suggested queries can be provided to a user based at least in part upon such first values and second values assigned to n-grams in text of emails in the email corpus.

The phrase extractor component 110 includes an n-gram selector component 112 that receives text from the filter component 108 for each email in the email corpus and identifies n-grams therein. As used herein, n-gram is a subsequence of words in text provided by the filter component 108, wherein a number of words in the subsequence can range, for example, from between one word and five words. To identify appropriate n-grams in text of emails (including subject lines of emails), the n-gram selector component 112 can tokenize the text using a language dependent tokenizer to identify each sequence of words (between one and five words long) as a candidate word sequence.

The phrase extractor component 110 also includes a form calculator component 114 that computes the 1st value mentioned above for each candidate word sequence provided by the n-gram selector component 112. The value assigned to a candidate word sequence by the form calculator component 114 is referred to herein as a well-formedness score. The form calculator component 114 can be configured to assign a relatively high well-formedness score to an n-gram that begins with a noun, verb, or participle, and ends with a noun or participle. Likewise, the form calculator component 114 can be configured to provide a relatively low well-formedness score to n-grams that do not have such structure (e.g. begin with an adverb or adjective and end with a verb, for example). Pursuant to an example, the form calculator component 114 can include one or more natural language processing algorithms to identify syntactic structure of n-grams received from the n-gram selector component 112. In another exemplary embodiment, as will be described in greater detail below, the form calculator component 114 can employ a heuristic an approach when computing the well-formedness score for an n-gram.

The phase extractor component 110 also includes a key phrase identifier component 116 that receives candidate word phrases (candidate n-grams) from the form calculator component 114 and their respective well-formedness scores that are assigned thereto. The key phrase identifier component 116, for each candidate word phrase, compares the respective assigned well-formedness score with a predefined threshold. If the well-formedness score for a candidate word phrase falls beneath the predefined threshold, then the key phrase identifier component 116 discards the candidate word phrase. If, however, the key phrase identifier component 116 determines that the well-formedness score for the candidate word phrase is at or above the threshold, then the key phrase identifier component 116 can add the candidate word phrase to a list of candidate key phrases.

The phrase extractor component 110 additionally comprises an informativeness calculator component 118 that computes a second value for each phrase in the list of candidate key phrases generated by the key phrase identifier component 116, wherein the second value is indicative of a number of emails retrievable when searching over the email corpus using the respective candidate key phrase. This second value can be referred to herein as an informativeness score. The informativeness calculator component 118 can assign a relatively high informativeness score to a candidate key phrase if a number of documents retrievable when searching the email corpus using the candidate key phrase is relatively low. This indicates that the candidate key phrase is highly informative of the content of an email that includes such candidate key phrase. Conversely, if querying the email corpus with the candidate key phrase would result in retrieval of a large number of emails, then the informativeness score assigned to the candidate key phrase by the informativeness calculator component 118 can be relatively low, as such candidate phrase is not informative as to content of a particular email.

The key phrase identifier component 116 can receive candidate key phrases and informativeness scores assigned thereto and can discard candidate key phrases with informativeness scores that lie beneath a predefined threshold. Candidate key phrases that have been assigned an informativeness score by the informativeness calculator component 118 that are above the threshold can be output by the key phrase identifier component 116 as key phrases. While the above description indicates that the well-formedness score is computed prior to the informativeness score, it is to be understood that the informativeness score can be computed prior to the well-formedness score. Furthermore, a well-formedness score and an informativeness score can be assigned to each candidate word phrase output by the n-gram selector component 112, and the key phrase identifier component 116 can output candidate word phrases as key phrases when both the informativeness score and the well-formedness score are above their respective threshold values, or the combination of such scores is above a predefined threshold.

It can therefore be ascertained that the phrase extractor component 110 identifies key phrases from text in emails in the email corpus that are both well-formed and informative as to the content of the email. An indexer component 120 can receive the key phrases and can generate a forward index 122 and an inverted index 124. The forward index 122 can identify which key phrases output by the phrase extractor component 110 are included in specified emails (key phrases are indexed by emails). The inverted index 124 can identify, for a given key phrase, which emails in the email corpus include such key phrase (emails are indexed by key phrases). As will be described below, the forward index 122 and the inverted index 124 can be employed when selecting key phrases to present as suggested queries to a user. As shown, the indexer component 120 can cause the forward index 122 and the inverted index 124 to be retained in the data store 102. When an email is added to the email corpus or removed from the email corpus, the system 100 can be configured to update the forward index 122 and the inverted index 124.

In an exemplary embodiment, the informativeness calculator component 118 can compute the informativeness score of a key phrase $w_1 w_2 \ldots w_n$ as follows:

$$Info(w_1 w_2 \ldots w_n) = \alpha * Info(w_1 w_2 \ldots w_n; UserEmails) +$$
$$(1-\alpha) * Info(w_1 w_2 \ldots w_n; EnterpriseEmails)$$

where $$Info(w_1 w_2 \ldots w_n; UserEmails) = \frac{1}{n}\sum_{i=1}^{n} IDF(w_i; UserEmails);$$

$$Info(w_1 w_2 \ldots w_n; EnterpriseEmails) = \frac{1}{n}\sum_{i=1}^{n} IDF(w_i; EnterpriseEmails);$$

$$IDF(w_i; UserEmails) = \log\left(\frac{N}{DF(w_i; Useremails)}\right);$$

and $$IDF(w_i; EnterpriseEmails) = \log\left(\frac{N'}{DF(w_i; EnterpriseEmails)}\right),$$

where $DF(w_i; Useremails)$=number of emails in user emails 104 containing the term $w_i$, $DF(w_i; EnterpriseEmails)$=number of emails in the enterprise emails 106 containing the term $w_i$, N=number of emails in the user emails 104, N'=number of emails in the enterprise emails 106, $\alpha$ is a selectable weight between 0 and 1 (e.g., 0.25). Additionally, $Info(w_1 w_2 \ldots w_n)$ can be normalized to obtain a value between 0 and 1.

With respect to the form calculator component 114, the form calculator component 114 can be configured to compute a well-formedness score for a candidate word phrase $w_1 w_2 \ldots w_n$ as follows:

$$LM(w_1 w_2 \ldots w_n) = \beta * LM(w_1 w_2 \ldots w_n; UserEmails) +$$
$$(1-\beta) * LM(w_1 w_2 \ldots w_n; EnterpriseEmails),$$

where $$LM(w_1 w_2 \ldots w_n; UserEmails) =$$
$$\frac{1}{n}\sum_{i=1}^{n} \log p(w_i \mid w_{i-1}, w_{i-2}, \ldots w_{i-k}; UserEmails);$$

$$LM(w_1 w_2 \ldots w_n; EnterpriseEmails) =$$
$$\frac{1}{n}\sum_{i=1}^{n} \log p(w_i \mid w_{i-1}, w_{i-2}, \ldots w_{i-k}; EnterpriseEmails);$$

$p(w_i | w_{i-1}, w_{i-2}, \ldots w_{i-k}; Useremails)$ is a smoothed k-gram language model score computed over the user emails 104 (e.g., k=3);
$p(w_i | w_{i-1}, w_{i-2}, \ldots w_{i-k}; EnterpriseEmails)$ is a smoothed k-gram language model score computed over the enterprise emails 106, $\beta$ is a weight between 0 and 1 (e.g., $\beta$=0.25). It can be ascertained that $LM(w_1 w_2 \ldots w_n; UserEmails)$ and $LM(w_1 w_2 \ldots w_n; EnterpriseEmails)$ are non-positive; accordingly, $LM(w_1 w_2 \ldots w_n)$ can be converted to a positive number between 0 and 1 by adding a positive constant and then dividing by a constant.

The threshold values that are employed when identifying whether a key phrase is suitably well-formed and suitably informative can be ascertained in an automated fashion and/or through a trial and error approach. Such threshold values can be based upon, for example, a number of emails to be considered or other suitable variables.

Figure 2:
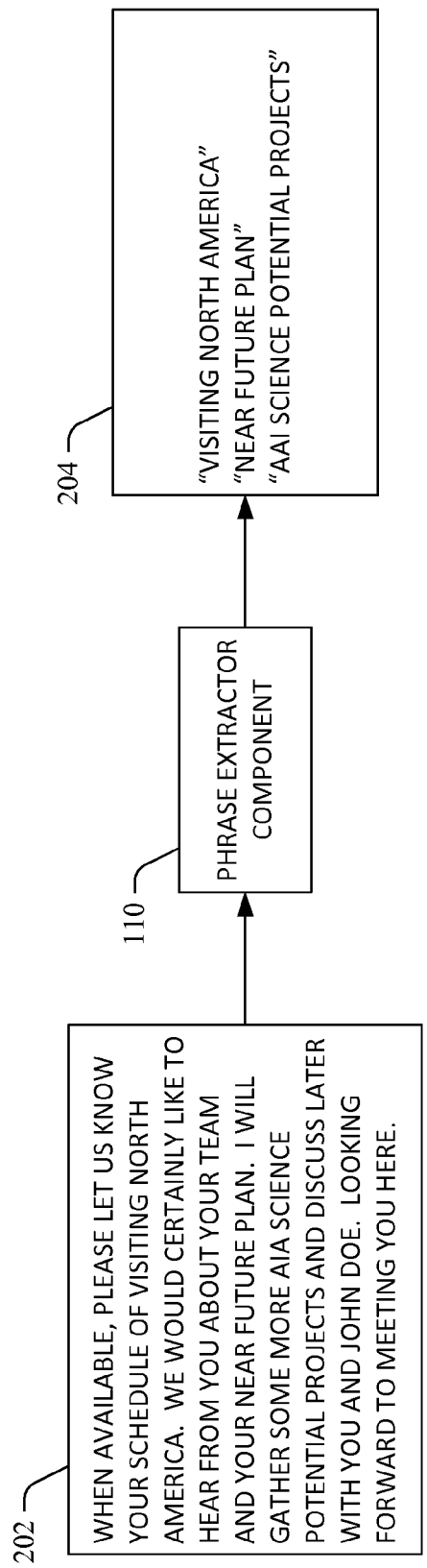
FIG. 2 is a functional block diagram of an exemplary system that facilitates exemplary key phrases that are extracted from documents in a document corpus.

Now referring to FIG. 2, an exemplary extraction of key phrases from text undertaken by the phrase extractor component 110 is illustrated. The phrase extractor component 110 receives text 202, and the n-gram selector component 112 extracts each possible n-gram from the text 202. The informativeness calculator component 118 and the form calculator component 114 compute the informativeness scores and well-formedness scores for n-grams extracted from the text 202. In the example shown in FIG. 2, resulting key phrases include "visiting North America", "near future plan", and "AAI science potential projects." The identified key phrases may then be provided to the indexer component 120, which generates the forward index 122 and the inverted index 124.

Now referring to FIG. 3, an exemplary forward index 300 that can be generated by the indexer component 120 is illustrated. The forward index 300 comprises a first column 302 and a second column 304, wherein the forward index 300 includes a number of rows that is the equivalent to a number of emails in the email corpus that include key phrases. Key phrases are indexed by email identities. Accordingly, if the forward index 300 is accessed and a first email ("email1") is provided as a key into the index 300, "key phrase one", "key phrase two", and other key phrases that are included in email1 will be returned.

With reference now to FIG. 4, an exemplary inverted index 400 is illustrated. The inverted index 400 includes a first column 402 and a second column 404, wherein the first column 402 includes key phrases and the second column 404 includes emails that comprise such key phrases. Accordingly, emails are indexed by key phrases identified by the phrase extractor component 110. Thus, if "key phrase 2" is provided as a key to the inverted index 400, "email1", "email6", and other emails that include key phrase to will be returned.

Figure 5:
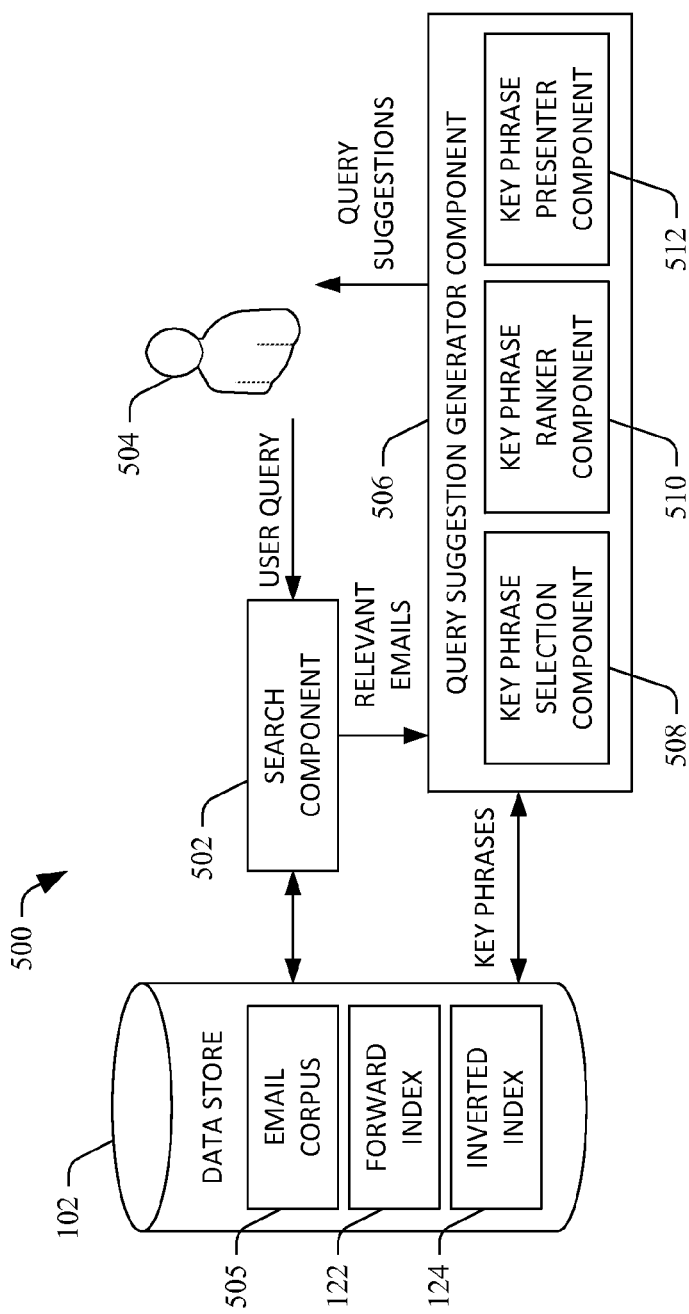
FIG. 5 is a functional block diagram of an exemplary system that facilitates providing a user with query suggestions independent of any query logs.

Now referring to FIG. 5, an exemplary system 500 that facilitates automatic provision of query suggestions to a user responsive to the user providing a query to system is illustrated. The system 500 provides query suggestions independent of any query logs. The system 500 comprises a search component 502 that receives a user query from a user 504. The search component 502 executes a search using the user query over an email corpus 505 (which includes the user emails 104 and/or the enterprise emails 106), and retrieves emails that are relevant to the user query. The search component 502 can include any suitable search algorithm that is configured to retrieve search results responsive to receipt of a query. For instance, the search component 502 may be included in an email application, wherein the search component 502 is configured to retrieve emails that include each word in the query. Further, as used herein, the term "user query" is intended to encompass a partial query, such that as the user formulates the user query, the search component 502 can search over the emails in the email corpus based upon the portion of the user query that is received.

The system 500 additionally includes a query suggestion generator component 506 that receives emails found to be relevant to the user query by the search component 502, and outputs query suggestions to the user 504 based at least in part upon content of the received emails. With more particularity, the query suggestion generator component 506 can include a key phrase selection component 508 that identifies key phrases that are desirably provided to the user 504 as query suggestions. For each email found to the relevant to the user query by the search component 502, the key phrase selection component 508 accesses the forward index 122 to identify key phrases that are included in such emails. The identified key phrases from the forward index 122 can be referred to as candidate suggestions, as such key phrases are candidates to be provided as query suggestions to the user 504. As the key phrase selection component 508 may identify a relatively large number of candidate suggestions (hundreds or even thousands), the key phrase selection component 508 can select a subset of such candidate suggestions to be provided to the user as query suggestions. When selecting a subset of the candidate suggestions, the key phrase selection component 508 can take into consideration both informativeness of a candidate suggestion as well as coverage of the candidate suggestion. Specifically, the key phrase selection component 508 can access the inverted index 124 to ascertain which emails in the search results are retrievable when searching the email corpus 505 using the candidate suggestion as a query. It can be understood that there is a trade-off between informativeness and coverage—the more informative a candidate suggestion is of content of an email, the fewer emails such candidate suggestion will cover. Moreover, it may be desirable to avoid provision of query suggestions to the user 504 that have similar coverage (e.g., result in retrieval of a similar set of documents). In other words, it may be undesirable to provide a user with two query suggestions that result in retrieval of the same set of search results when issued as queries over the email corpus 505.

In an exemplary embodiment, the key phrase selection component 508 can employ the following algorithm and constraints when selecting the subset of emails from the email corpus 505, where q is the user query, $e_1, e_2, \ldots, e_n$ is the subset of emails in the email corpus 505 that are retrieved by the search component 502 when searching over the document corpus 505 using the query q, $t_1, t_2, \ldots, t_m$ are key phrases included in the subset of emails, and it is desirable to select $m_0 \leq m$ key phrases for presentation to the user 504 as query suggestions:

$$\text{maximize} \sum_{i=1}^{m} b_i x_i - \sum_{j=1}^{n} a_j \xi_j$$

$$\text{s.t.} \sum_{i=1}^{m} x_i \leq M$$

$$\xi_j + \sum_{i: t_i \in e_j}^{m} x_i \geq 1, \text{ for } j = 1, \ldots, n$$

$$x_i \in \{0, 1\}, i = 1, \ldots, m$$

$$\xi_j \in \{0, 1\}, j = 1, \ldots, n$$

where $a_j \geq 0$ is a penalty for not covering the email $e_j$, $j=1, \ldots, n$, $b_i \geq 0$ is a benefit of selecting the key phrase $t_i$, $i=1, \ldots, m$, $x_i$ is an indicator variable (e.g., $x_i=1$ if key phrase $t_i$ is selected and $x_i=0$ otherwise), $\xi_j$ is a slack variable (e.g., $\xi_j=1$ if email $e_j$, is not covered and $\xi_j=0$ otherwise), and $t_i \in e_j$ indicates that key phrase $t_i$ covers email $e_j$ (querying the document corpus 505 using $t_i$ results in retrieval of email $e_j$. The constraint $\xi_j + \Sigma_{i: t_i \in e_j}^{m} x_i \geq 1$ ensures that every email is either covered by at least one key phrases or the corresponding slack is 1. The constraint $\Sigma_{i=1}^{m} x_i \leq M$ ensures that at most M key phrases are selected. The term $\Sigma_{j=1}^{n} \alpha_j \xi_j$ in the objective function is the total penalty for not covering some of the emails in the set $e_1, e_2, \ldots, e_n$, and the term $\Sigma_{i=1}^{m} b_i x_i$ is the total benefit of selecting the subset of key phrases. Thus, it is desirable to minimize the total penalty while maximizing the total benefit.

$\{\alpha_j\}_{j=1}^{n}$ and $\{b_i\}_{i=1}^{m}$ can be selected in any suitable manner. Pursuant to an example, $\alpha_j = \gamma$. In another example, $$a_j = \begin{cases} \gamma_1 & \text{if } e_j \text{ is a recent mail or by an important contact} \\ \gamma_2 & \text{otherwise.} \end{cases}$$

In another exemplary embodiment, $b_i = \text{Info}(t_i) \ast \text{LM}(t_i)$. In still yet another exemplary embodiment, $b_i = \text{Info}(t_i)$.

As can be ascertained, the above algorithm is a linear integer program (an objective function) that is desirably maximized. Constraints that may be desirably satisfied is that at most, m key phrases should be provided to the user 504 as query suggestions. Another constraint that may be considered is that each email in the set of emails returned by the search component 502 is covered by the set of key phrases to be provided to the user 504 as suggested queries, or a penalty is invoked. Exemplary penalties include a penalty for not covering a particular email, wherein such penalty may be constant, may be based upon recency of an email (a larger penalty is incurred if a more recent email is not covered), based upon whether the email is from or to a contact deemed to be important or unimportant, etc.

Benefits that may be considered when maximizing the objective function can be based upon the well-formedness score assigned to a key phrase, the informativeness score of a key phrase, etc. Once the objective function is formed, the key phrase selection component 508 can execute a solver that utilizes an approximation algorithm to solve such function.

The query suggestion generator component 506 additionally includes a key phrase ranker component 510 that ranks the key phrases identified by the key phrase selection component 508 for provision to the user 504. That is, subsequent to the key phrase selection component 508 selecting a threshold number of key phrases to provide to the user 504 as suggested queries, the key phrase ranker component 510 can rank such key phrases such that they are presented in an order of estimated relevance to the user 504 (e.g., a key phrase believed to return most relevant documents to the user 504 when used as a query is presented first while other key phrases are presented beneath such key phrase). In an exemplary embodiment, ranking key phrases in the subset of key phrases $t_{i_1}, t_{i_2}, \ldots, t_{i_M}$ identified by the key phrase selection component 508 can be undertaken by the key phrase ranker component 510 through utilization of the following algorithm:

$$\text{RankScore}(t_{i_k}) = \text{Info}(t_{i_k})^{\lambda_1} \text{LM}(t_{i_k})^{\lambda_2} \text{Coverage}(t_{i_k})^{\lambda_3},$$

Where $\text{Info}(t_{i_k})$ is the informativeness score assigned to key phrase $t_{i_k}$, $\text{LM}(t_{i_k})$ is the well-formedness score assigned to the key phrase $t_{i_k}$, $\text{Coverage}(t_{i_k})$ is the fraction of emails in $e_1, e_2, \ldots, e_n$ covered by $t_{i_k}$, and $\lambda_1, \lambda_2, \lambda_3$ are constants with values that can be selected empirically. In an example, such values can each be 1. The key phrases can then be sorted based upon their respective scores. The output of the key phrase ranker component 510 is a ranked list of key phrases that are to be presented to the user 504 as query suggestions.

The query suggestion generator component 506 can include a key phrase presenter component 512 that presents the query suggestions to the user 504 in a particular form on a display screen of a computing device. For instance, the key phrase presenter component 512 can present the key phrases as a ranked list of query suggestions, wherein each query suggestion is selectable by the user 504, and wherein selection of the query suggestion causes the search component 502 to query the email corpus 505 using the selected query suggestion as a query. In another example, the key phrase presenter component 512 can present the suggested queries in a tag cloud, wherein the query suggestions may be displayed with attributes that provide additional information pertaining to the query suggestions and/or results retrievable using the query suggestions. For instance, size of a query suggestion in a tag cloud may be indicative of probabilistic relevance to the user of the query suggestion, a number of emails will be returned responsive to executing a search using the query suggestion, or other information.

Further, the key phrase presenter component 512 can present additional information pertaining to a query suggestion responsive to the user 504 hovering a cursor over such query suggestion. For instance, if a user hovers a cursor over a particular query suggestion, identities of a threshold number of most recently received emails that are retrievable using the query suggestion can be presented to the user 504 as a tooltip. Thus, by hovering, the user 504 can quickly ascertain whether any of the query suggestions will provide the user with the document she desires to locate. Still further, the key phrase presenter component 512 can present the query suggestions as a ranked list along with other meta-data navigation opportunities, such as frequency sorted search results on From:X, small pictures sorted by their number of emails satisfying the user's query, a time histogram, or other suitable data.

Figure 6:
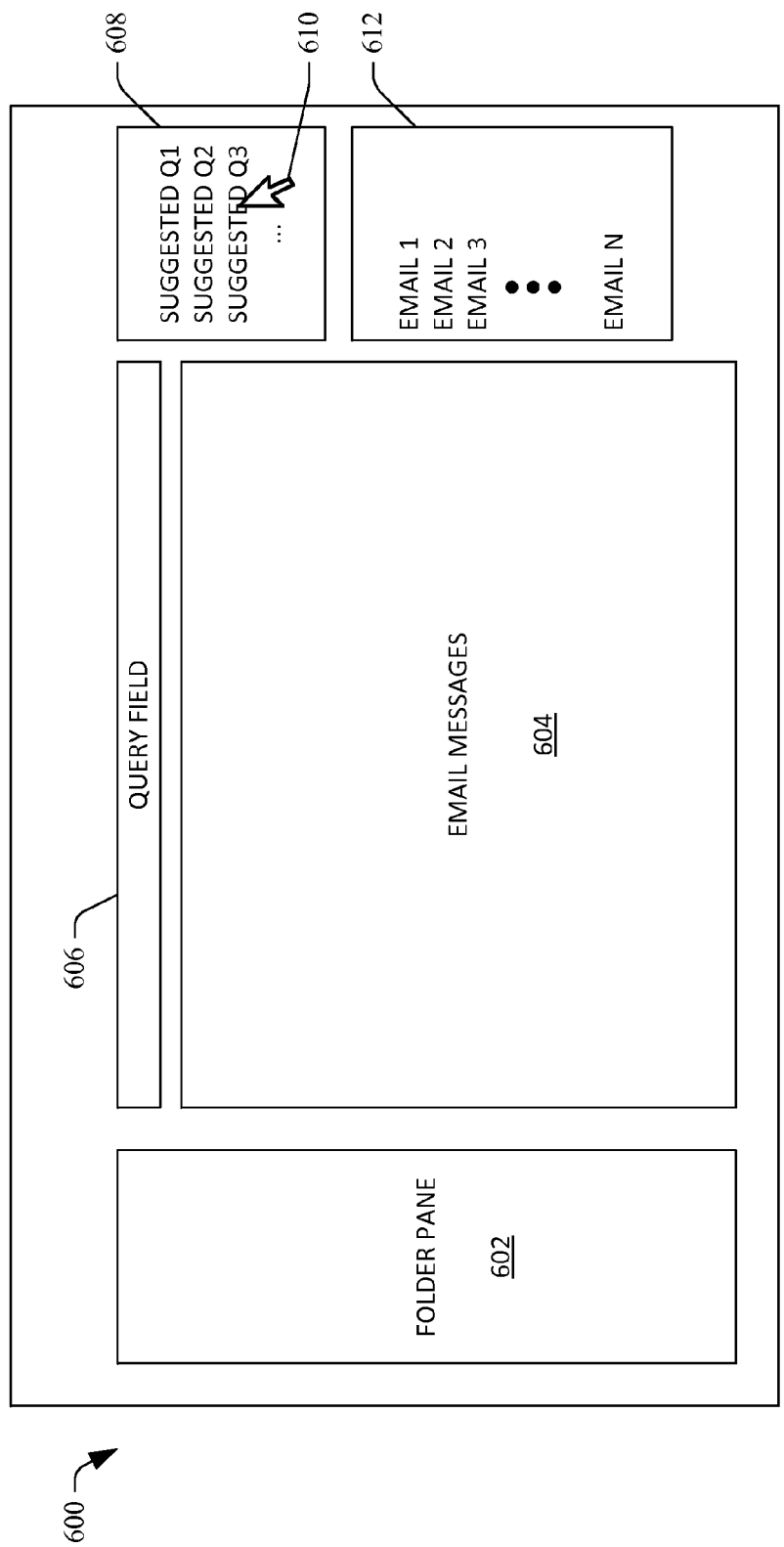
FIG. 6 is an exemplary graphical user interface.

With reference now to FIG. 6, an exemplary graphical user interface 600 that can be employed in connection with presenting suggested queries to a user is illustrated. The graphical user interface 600 includes a folder pane 602 that can include a listing of email folders, wherein users can cause emails to be placed in certain folders. The graphical user interface 600 may further include an email messages pane 604 that presents emails that are in a folder selected in the folder pane 602. A query field 606 can receive a user query, wherein a search can be conducted over emails in a selected folder or over email across all folders.

As described above, a list of suggested queries 608 can be presented to the user responsive to the user entering a query into the query field 606. As indicated above, the query may be a partial query, such that the suggested queries 608 are query completions to the partial query. In another exemplary embodiment, a query entered into the query field 606 may be an entirety of a query, such that the suggested queries 608 are set forth as alternate queries to the query placed in the query field 606.

The user may hover a cursor 610 over one of the suggested queries in the list of suggested queries 608, and responsive to detecting that the cursor 610 is hovered over a suggested query, a list of emails 612 that includes a threshold number of most recent emails that are retrievable when using the suggested query as a query over the emails is presented.

Figure 7:
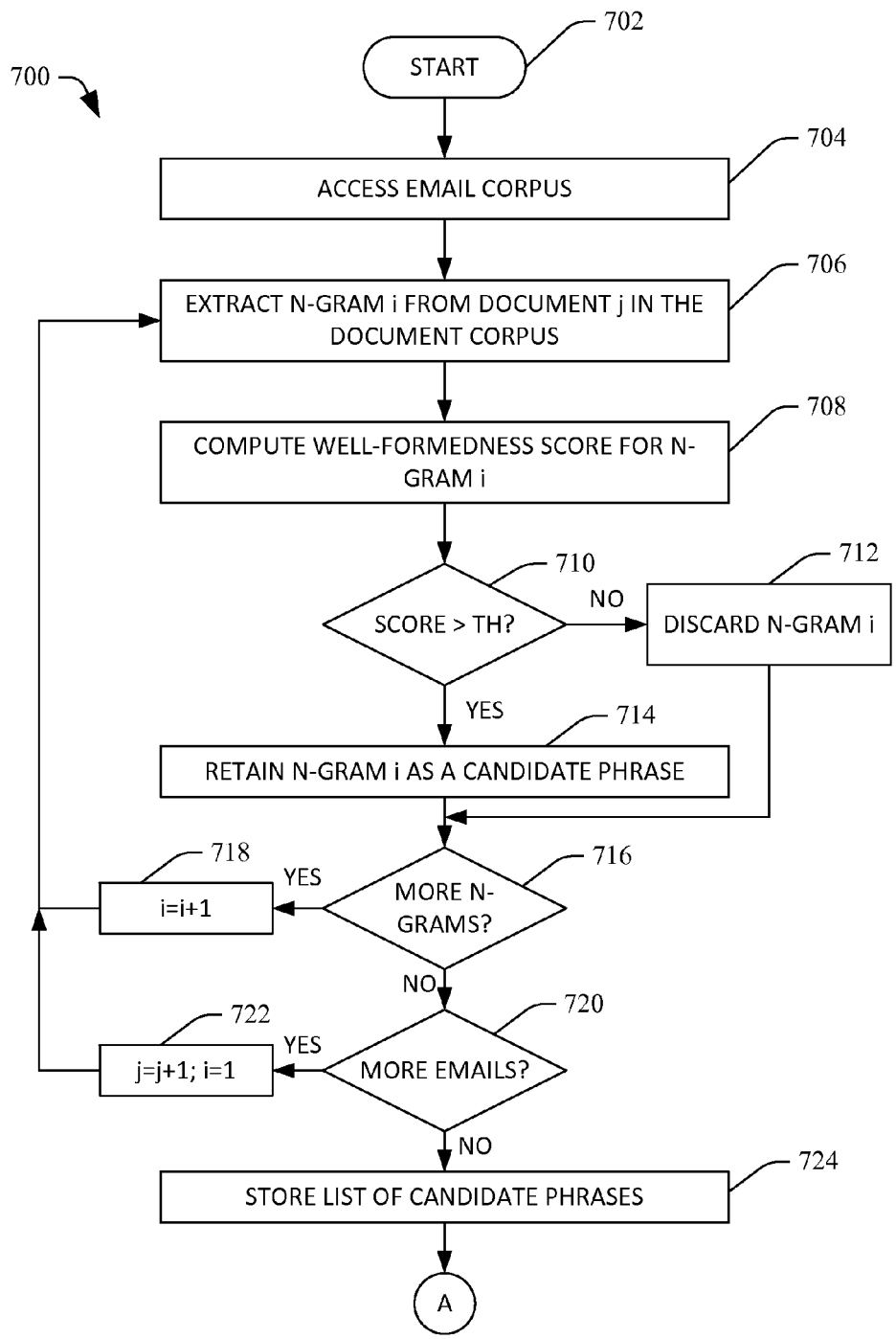
FIGS. 7 and 8 illustrate an exemplary methodology for identifying key phrases in documents of a document corpus.
Figure 8:
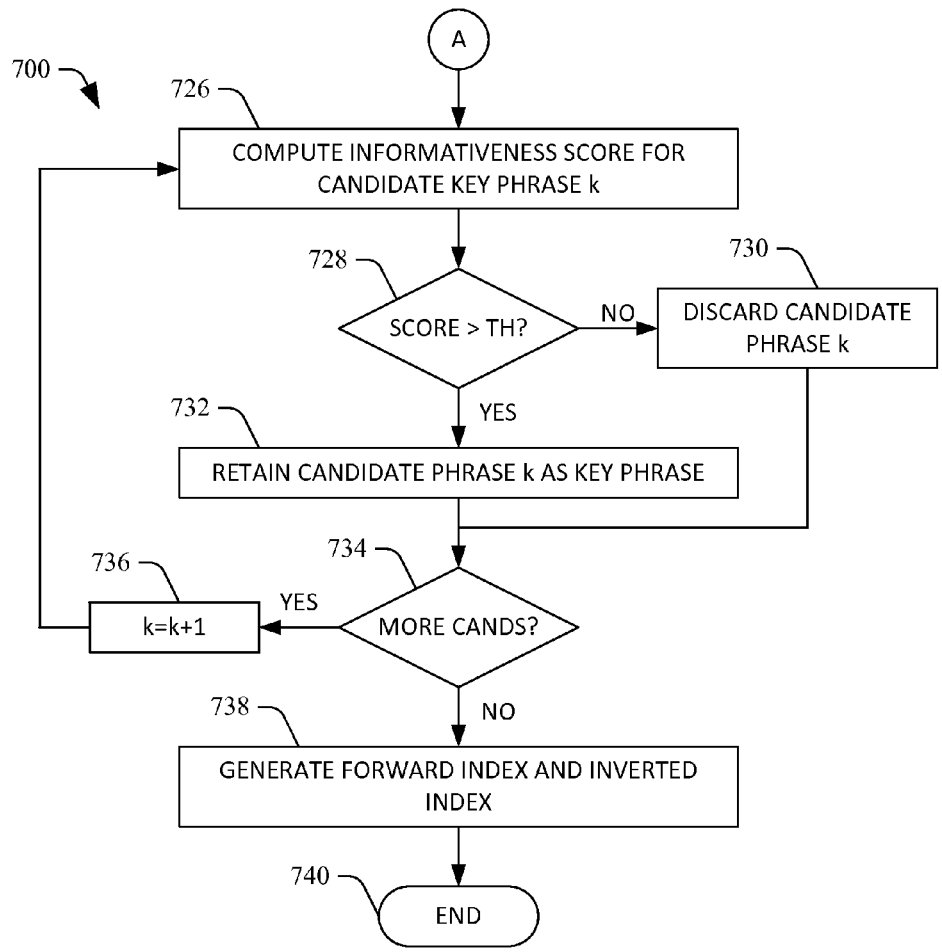
Figure 9:
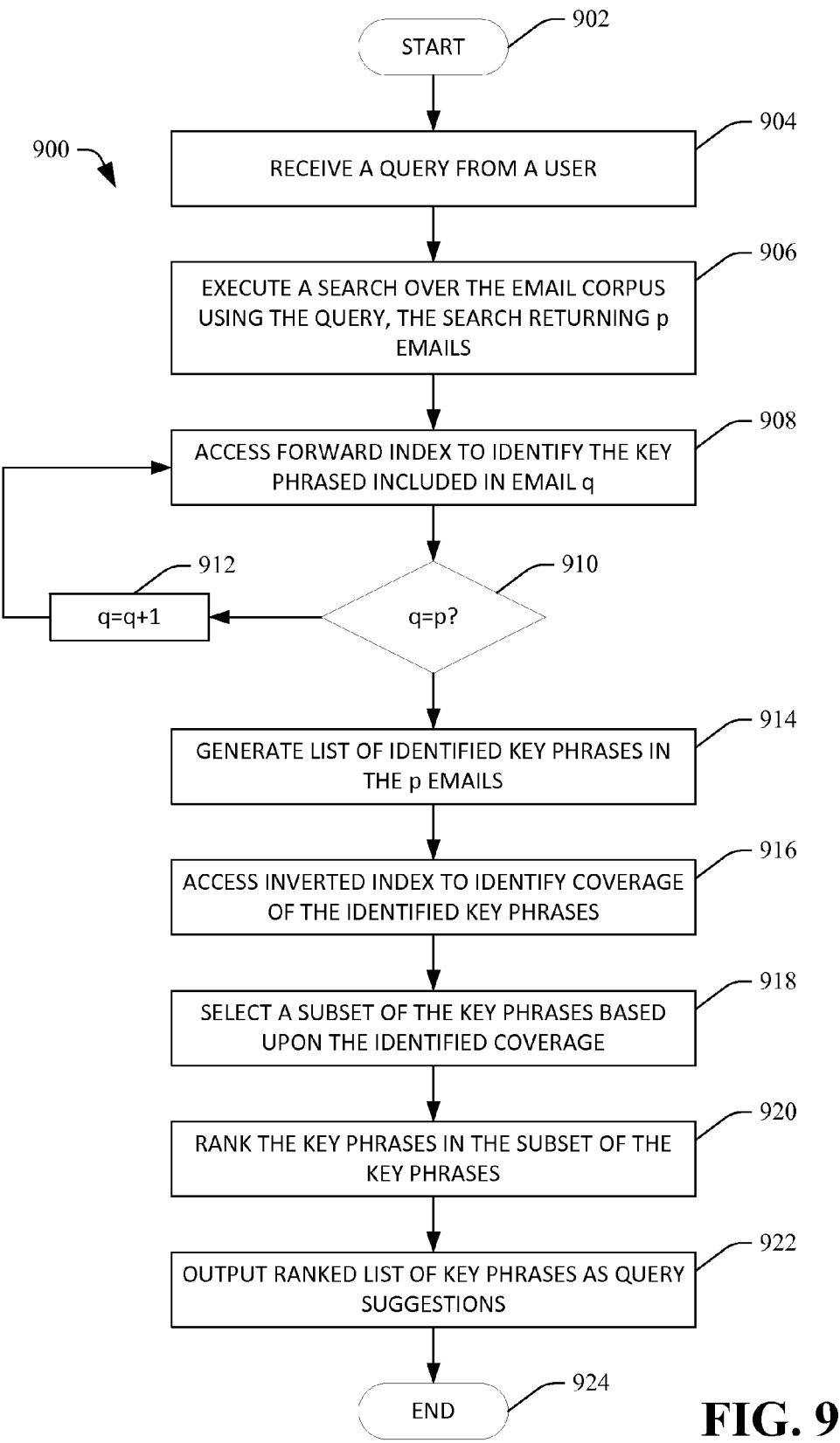
FIG. 9 illustrates an exemplary methodology for outputting query suggestions independent of a query log.

With reference now to FIGS. 7-9, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring to FIG. 7, an exemplary methodology 700 that facilitates generating a forward index and an inverted index to employ in connection with automatically providing query suggestions is illustrated. The methodology 700 starts at 702, and at 704 an email corpus is accessed. At 706, an n-gram from a jth document in the document corpus is extracted. For example, size of the n-gram may be between 1 and 5 words.

At 708, a well-formedness score is computed for n-gram i in the document j. At 710, a comparison is made between the well-formedness score and a predefined threshold. If the well-formedness score is not above the predefined threshold, then at 712 n-gram i is discarded (n-gram i is not retained as a candidate key phrase). If, however, the well-formedness score assigned to the n-gram is above the threshold, then n-gram i is retained as a candidate phrase at 714.

At 716, a determination is made regarding whether additional n-grams exist in document j. If there are additional n-grams to consider, at 718 i is incremented such that the next n-gram in document j is considered, and the methodology returns to 706. Accordingly, for each n-gram in an email, a well-formedness score is computed, and such well-formedness score is compared to the predefined threshold. If there are no additional n-grams in email j, then at 720 a determination is made regarding whether additional emails exist in the email corpus. If additional emails exist in the email corpus, then at 722 j is incremented and i is reset, such that a first n-gram in the next email is considered. The methodology 700 then returns to 706. If at 720 it is determined that no further emails exist in the email corpus, then at 724 a list of candidate key phrases is stored, wherein the list of candidate key phrases includes each n-gram in the email corpus that has a well-formedness score above the predefined threshold.

Turning now to FIG. 8, the methodology 700 continues to act 726, where an informativeness score for candidate key phrase k (with k initially being set to one) in the list of candidate key phrases is computed. At 728, a determination is made regarding whether the informativeness score is above a predefined threshold. If the informativeness score for candidate phrase k is not above the predefined threshold, then at 730 candidate phrase K is discarded. If it is ascertained at 728 that the informativeness score is above the predefined threshold, then at 732 candidate phrase K is retained as a key phrase in a list of key phrases. At 734 a determination is made regarding whether additional candidate key phrases exist in the list of candidate key phrases, and if so, at 736 the next candidate key phrase in the list of candidate key phrases is accessed (e.g., k is incremented), and the methodology 700 returns to 726. If at 734 it is determined that there are no additional candidate key phrases, then at 738 a forward index and an inverted index are computed. As described above, the forward index indexes key phrases by emails that include such key phrases, and the inverted index indexes emails by key phrases that are included therein. The methodology 700 completes at 740.

With reference now to FIG. 9, an exemplary methodology 900 that facilitates provision of query suggestions to a user is illustrated. The methodology 900 starts at 902, and at 904 a query is received from a user. At 906, a search over an email corpus is executed using the query, wherein the search returns p emails.

At 908, a forward index is accessed to identify key phrases that are included in email q, wherein email q is a search result retrieved during the search. At 910, a determination is made regarding whether the email is the last email returned during the search (whether q equals p). If the email is not the last email retrieved during the search, a subsequent email is considered by incrementing q at 912. The methodology 900 then returns to 908. Subsequent to the key phrases in the emails returned during the search being identified, a list of identified key phrases in the p emails can be generated at 914.

At 916, the inverted index is accessed to identify coverage of the key phrases in the list of key phrases. At 918, a subset of key phrases in the list of key phrases is selected based at least in part upon the identified coverage. For instance, an objective function can be maximized to select the subset of key phrases from the list of key phrases. At 920, the key phrases in the subset of the key phrases are ranked, and at 922 a ranked list of key phrases are output as query suggestions to the user. The methodology 900 completes at 924.

Figure 10:
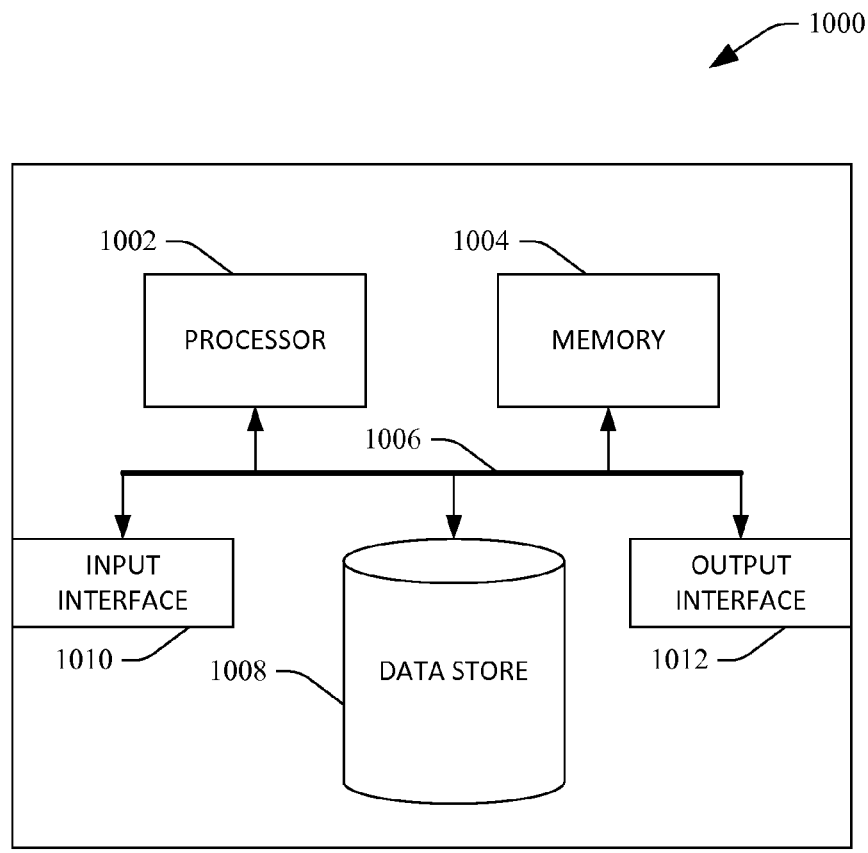
FIG. 10 is an exemplary computing system.

Now referring to FIG. 10, a high-level illustration of an exemplary computing device 1000 that can be used in accordance with the systems and methodologies disclosed herein is illustrated. For instance, the computing device 1000 may be used in a system that supports generating a forward index and inverted index with respect to documents and key phrases included therein. In another example, at least a portion of the computing device 1000 may be used in a system that supports provision of query suggestions to users independent of any query logs. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store documents, key phrases, queries, indices, etc.

The computing device 1000 additionally includes a data store 1008 that is accessible by the processor 1002 by way of the system bus 1006. The data store may be or include any suitable computer-readable storage, including a hard disk, memory, etc. The data store 1008 may include executable instructions, a forward index, an inverted index, documents, key phrases, etc. The computing device 1000 also includes an input interface 1010 that allows external devices to communicate with the computing device 1000. For instance, the input interface 1010 may be used to receive instructions from an external computer device, a user, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method that facilitates output of query suggestions responsive to receipt of a query, the method comprising:
   receiving the query from a user;
   locating a document in a document corpus based upon the query, the document comprising a phrase, the phrase having a first value and a second value assigned thereto, the first value being indicative of a number of documents from the document corpus that are retrievable when querying the document corpus using the phrase, the second value being indicative of a syntactic structure of the phrase, the first value being above a first threshold value and the second value being above a second threshold value;
   responsive to locating the document, selecting the phrase as a suggested query based at least in part upon the first value assigned to the phrase and the second value assigned to the phrase, wherein the selecting of the phrase as the suggested query is undertaken independent of a query log; and
   displaying the suggested query on a display screen of a computing device as a selectable graphical object, wherein selection of the suggested query from the user causes a search to be executed over the document corpus using the suggested query.

2. The method of claim 1, wherein a plurality of documents are located based upon the query, wherein the plurality of documents comprise a plurality of phrases, and wherein the phrase is selected as the suggested query from amongst the plurality of phrases.

3. The method of claim 1, wherein the document corpus is one of an email corpus, an instant message corpus, or a word processing document corpus.

4. The method of claim 1, further comprising:
   locating a first plurality of documents in the document corpus based upon the query;
   displaying first graphical data that identifies, respectively, the first plurality of documents on the display screen of the computing device;
   receiving a selection of the suggested query from the user; and
   displaying second graphical data that identifies, respectively, a second plurality of documents that are retrievable from the document corpus when querying the document corpus using the suggested query, the second graphical data displayed simultaneously with the first graphical data.

5. The method of claim 1, wherein the suggested query is displayed as a portion of a tag cloud on the display screen of the computing device.

6. The method of claim 1, wherein a plurality of documents are located based upon the query, wherein the plurality of documents comprise a plurality of phrases, and wherein selecting the phrase as the suggested query comprises providing the plurality of phrases to an objective function and maximizing the objective function to select a subset of phrases from amongst the plurality of phrases, the phrase included in the subset of phrases.

7. The method of claim 6, further comprising:
ranking phrases in the subset of phrases to generate a ranked list of phrases; and
displaying the ranked list of phrases as a ranked list of query suggestions, wherein the suggested query is included in the ranked list of query suggestions.

8. The method of claim 1, wherein the document corpus comprises emails, and wherein the emails comprise emails of the user and emails of an enterprise to which the user belongs.

9. The method of claim 1, further comprising:
extracting phrases from documents in the document corpus;
for each phrase, performing the following acts:
computing a respective first value;
computing a respective second value; and
retaining a respective phrase as a key phrase if and only if the respective first value for the respective phrase is above the first threshold and the respective second value is above the second threshold;
generating a forward index that identifies, for each document in the document corpus, respective key phrases included in a respective document; and
generating an inverted index that identifies, for each key phrase, documents in the document corpus that include a respective key phrase.

10. The method of claim 9, further comprising:
receiving a new document that is to be added to the document corpus; and
updating the forward index and the inverse index based upon key phrases extracted from the new document.

11. The method of claim 9, further comprising:
receiving an indication that a first document is desirably deleted from the document corpus; and
updating the forward index and the inverse index based upon key phrases included in the first document.

12. The method of claim 1, further comprising computing the second value based at least in part upon a natural language processing algorithm that identifies the syntactic structure of the phrase.

13. The method of claim 1, wherein the second value indicates that the phrase begins with one of a noun, a verb, or a participle, and ends with one of a noun or a participle.

14. A system that facilitates provision of a suggested query to a user responsive to receipt of a query, the system comprising:
a processor; and
a memory comprising a plurality of components that are executed by the processor, the plurality of components comprising:
a search component that receives a query from a user and executes a search over a document corpus based upon the query, the search component retrieving a document from the document corpus during the search; and
a query suggestion generator component that outputs the suggested query to the user responsive to receiving the query from the user, the suggested query being a phrase in the document retrieved during the search, the query suggestion generator component selecting the phrase from amongst a plurality of potential phrases based at least in part upon a first value assigned to the phrase and a second value assigned to the phrase, the first value being indicative of a number of documents retrievable from the document corpus when querying the document corpus using the phrase, the second value being indicative of parts of speech included in the phrase and arrangement of the parts of speech included in the phrase, wherein the first value is above a first threshold value and the second value is above a second threshold value and wherein the selecting of the phrase as the suggested query is undertaken independent of a query log;
displaying the suggested query on a display screen of a computing device as a selectable graphical object, wherein selection of the suggested query from the user causes a search to be executed over the document corpus using the suggested query.

15. The system of claim 14, wherein the query suggestion generator component comprises a key phrase selection component that receives a plurality of key phrases and selects a subset of phrases from the plurality of key phrases for presentation to the user as query suggestions, the key phrase selection component selecting the subset of phrases based at least in part upon respective coverage of key phrases in the subset of phrases.

16. The system of claim 15, further comprising a key phrase ranker component that receives the subset of phrases and ranks the key phrases in the subset of phrases based at least in part a respective first value and a respective second value assigned to each phrase.

17. The system of claim 14 being comprised by an email application.

18. The system of claim 14, wherein the second value indicates that the phrase begins with one of a noun, a verb, or a participle, and ends with one of a noun or a participle.

19. A computer-readable medium comprising instructions that, when executed by a processor, cause the processor to perform acts comprising:
accessing a document corpus in a data repository of a computing device;
for an n-gram in a document in the document corpus, computing a first value and a second value, the first value indicative of a number of documents in the document corpus that include the n-gram, the second value indicative of arrangement of parts of speech in the n-gram;
comparing the first value with a first threshold value;
comparing the second value with a second threshold value;
labeling the n-gram as a key phrase subsequent to determining that the first value is above the first threshold value and the second value is above the second threshold value;
generating an inverted index that indexes the documents by key phrases;
generating a forward index that indexes the key phrases by the documents;
receiving a query from a user;
executing a search using the query responsive to receiving the query, the search returning the document that includes the key phrase;
accessing the forward index to identify that the key phrase is included in the document;
accessing the inverted index to identify other documents in the document corpus that include the key phrase;
selecting the key phrase as a suggested query based at least in part upon a number of the other documents in the document corpus that include the key phrase; and
outputting the suggested query as a selectable graphical object to the user.

* * * * *